Patented June 8, 1937

2,083,019

UNITED STATES PATENT OFFICE 2,083,019

POLYAZO-DYESTUFFS SOLUBLE IN WATER AND PROCESS OF PREPARING THEM

Fritz Hess and Walter Pense, Frankfort-on-the-Main-Hochst, Germany, assignors to General Aniline Works, Inc., New York, N. Y., a corporation of Delaware No Drawing. Application January 6, 1936, Serial No. 57,852. In Germany January 17, 1935

8 Claims. (Cl. 260—74)

The present invention relates to polyazo-dyestuffs soluble in water and to a process of preparing them, more particularly, it relates to dyestuffs of the following general formula:

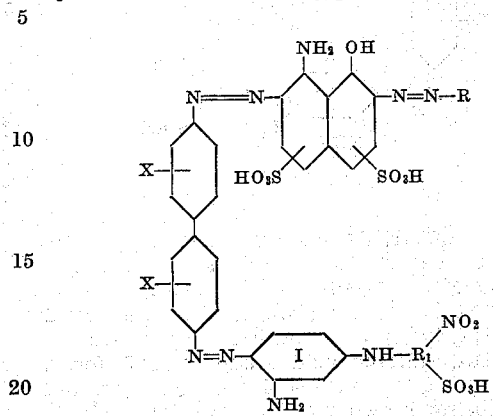

wherein R and $R_1$ stand for radicals of the benzene series, the X's for hydrogen, chlorine, methyl, methoxy or sulfonic acid groups and wherein the nucleus signified by I may be further substituted by methyl or sulfonic acid groups.

We have found that valuable polyazo-dyestuffs soluble in water are obtainable by condensing with a halogen-nitro-arylsulfonic acid containing an exchangeable halogen atom, a triamino-azo-dyestuff obtainable by coupling 1 mol of a tetrazo-compound in a mineral acid solution with 1 mol of a 1,8-aminonaphthol-disulfonic acid, and combining the intermediate product thus formed in an alkaline solution with a diazotized arylamine and a meta-diamine.

The brown to black dyestuffs thus obtained are distinguished by their good fastness to acids, and are especially adapted for dyeing leather.

The following examples serve to illustrate the invention, but they are not intended to limit it thereto; the parts are by weight:

(1) 26 parts of the triaminoazo-dyestuff, which is obtainable as described in German Patent No. 153,557 by tetrazotizing benzidine, coupling the tetrazo-compound in an acid solution with 1,8-aminonaphthol-3,6-disulfonic acid, combining the intermediate product thus obtained with diazobenzene chloride in a solution rendered alkaline by means of sodium carbonate and coupling this second intermediate product with meta-phenylenediamine, are dissolved in 300 parts of water. To this solution a solution of 9.4 parts of 1-chloro-2,6-dinitrobenzene-4-sulfonic acid in the form of its potassium salt in 120 parts of water and 5 parts of sodium acetate are added. The whole is heated in an autoclave for 7 to 8 hours at 140° C. to 150° C.

After cooling, the content of the autoclave is rendered acid to Congo paper by means of sulfuric acid whereby the dyestuff is precipitated. It is filtered, and sodium carbonate is added to the dyestuff paste until it shows an alkaline reaction. After evaporation, a nearly quantitative yield of a brownish-black leather dyestuff having a good fastness to acids is obtained. The dyestuff corresponds with the following probable formula:

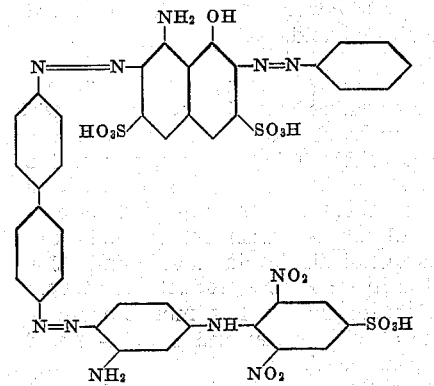

By using for the manufacture of the triaminoazo-dyestuff instead of the diazobenzenechloride its substitution products, for instance, nitro-, halogen-, alkyl-, alkoxy-, or sulfonic acid-derivatives, and instead of the benzidine, for instance, dichloro-benzidine, tolidine, or dianisidine, there are obtained dyestuffs of similar properties.

(2) In 1000 parts of water there are dissolved 82.3 parts of the triaminoazo-dyestuff, which is obtainable as described in German Patent No. 153,557 by tetrazotizing ortho-tolidine, coupling the tetrazo-compound in an acid solution with 1,8-aminonaphthol-3,6-disulfonic acid, combining the intermediate product obtained with ortho-diazotoluene in a solution rendered alkaline by means of sodium carbonate and coupling the second intermediate body obtained with meta-phenylenediamine. To this solution there are added a solution of 28.2 parts of 1-chloro- 2,4-dinitrobenzene-6-sulfonic acid in 400 parts of water, and 15 parts of sodium acetate, and the mixture is heated for 8 hours in an autoclave at 140° C. to 150° C. After cooling, the whole is salted out whereby the black dyestuff is precipitated. It is filtered with suction and dried.

Instead of the 1-chloro-2,4-dinitrobenzene-6-sulfonic acid there may be used for the condensation other halogen-nitrobenzenesulfonic acids, for instance, 1,3-dichloro-4,6-dinitrobenzene-2-sulfonic acid or 1-chloro-4-nitro-benzene-2-sulfonic acid.

(3) In 1000 parts of water there are dissolved 109 parts of the triaminoazo-dyestuff which is obtainable as described in the said German Patent No. 153,557 by tetrazotizing 4,4'-diaminodiphenyl-3,3'-disulfonic acid, coupling the tetrazocompound in an acid solution with 1,8-aminonaphthol-4,6-disulfonic acid, combining the intermediate body thus obtained in a solution, rendered alkaline by means of sodium carbonate, with diazotized sulfanilic acid and then coupling it with meta-phenylene-diamine. To this solution there are added a solution of 26 parts of the sodium salt of 1-chloro-4-nitrobenzene-2-sulfonic acid in 300 parts of water, and 15 parts of sodium acetate, and the mixture is heated in an autoclave for 8 hours at 140° C. to 150° C. After cooling, the content of the autoclave is rendered alkaline by means of sodium carbonate and evaporated.

In an analogous manner there are obtained brown to black dyestuffs suitable for dyeing leather by using instead of the meta-phenylenediamine its substitution products as, for instance, 1,2,4-toluylenediamine, 1,2,6-toluylenediamine, meta-phenylenediaminesulfonic acid or toluylenediaminesulfonic acid.

We claim:

1. A process of preparing polyazodyestuffs soluble in water which comprises condensing with a halogen-nitrobenzene-sulfonic acid containing an exchangeable halogen atom, a triaminoazo-dyestuff obtainable by coupling one molecule of a tetrazo-compound of the diphenyl series in a mineral acid solution with one molecule of a 1,8-aminonaphthol-disulfonic acid, and then combining the intermediate product thus formed in an alkaline solution with a monodiazo-compound of the benzene series and a meta-phenylenediamine compound.

2. A process of preparing polyazo-dyestuffs soluble in water which comprises condensing with a halogen-nitrobenzene-sulfonic acid containing an exchangeable halogen atom, a triaminoazo-dyestuff obtainable by coupling one molecule of a tetrazo-compound of the diphenyl series in a mineral acid solution with one molecule of 1,8-aminonaphthol-3,6-disulfonic acid, and then combining the intermediate product thus formed in an alkaline solution with a monodiazo-compound of the benzene series and meta-phenylenediamine.

3. A process of preparing a polyazo-dyestuff soluble in water which comprises condensing with 1-chloro-2,6-dinitrobenzene-4-sulfonic acid, a triaminoazo-dyestuff obtainable by coupling one molecule of tetrazotized benzidine in a mineral acid solution with one molecule of 1,8-aminonaphthol-3,6-disulfonic acid, and then combining the intermediate product thus formed in an alkaline solution with diazobenzene chloride and meta-phenylenediamine.

4. A process of preparing a polyazo-dyestuff soluble in water which comprises condensing with 1-chloro-2,4-dinitrobenzene-6-sulfonic acid, a triaminoazo-dyestuff obtainable by coupling one molecule of tetrazotized ortho-tolidine in a mineral acid solution with one molecule of 1,8-aminonaphthol-3,6-disulfonic acid, and then combining the intermediate product thus formed in an alkaline solution with ortho-diazotoluene and meta-phenylenediamine.

5. The polyazo-dyestuffs coresponding with the following general formula:

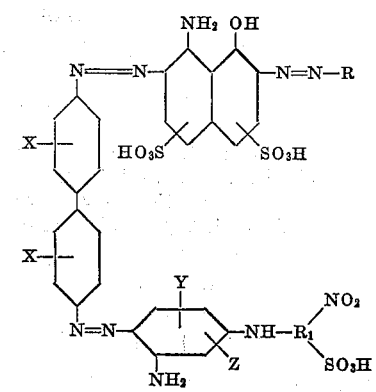

wherein R and R₁ stand for radicals of the benzene series, the X's for members of the group consisting of hydrogen, chlorine, methyl, methoxy and sulfonic acid groups, Y stands for a member of the group consisting of hydrogen, methyl and sulfonic acid groups and Z for a member of the group consisting of hydrogen and methyl, being brown to black powders, soluble in water, dyeing leather brown to black shades of good fastness properties, especially of good fastness to acids.

6. The polyazo-dyestuffs corresponding with the following general formula:

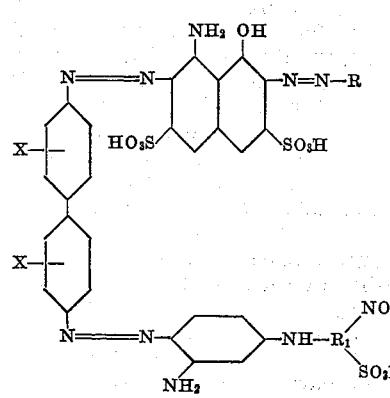

wherein R and R₁ stand for radicals of the benzene series, the X's for members of the group consisting of hydrogen, chlorine, methyl, methoxy and sulfonic acid groups, being brown to black powders, soluble in water, dyeing leather brown to black shades of good fastness properties, especially of good fastness to acids.

7. The polyazo-dyestuff of the following formula:

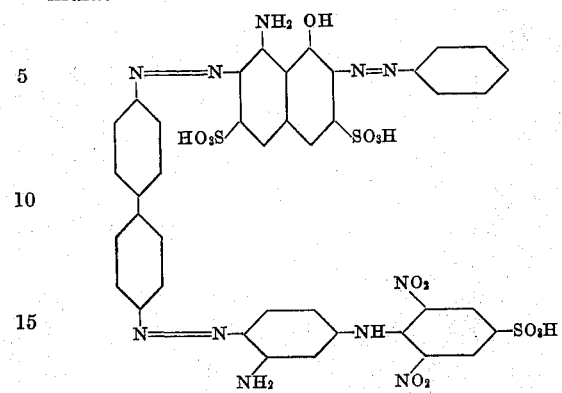

being a brownish-black powder, soluble in water, dyeing leather brownish-black shades of good fastness properties, especially of good fastness to acids.

8. The polyazo-dyestuff of the following formula:

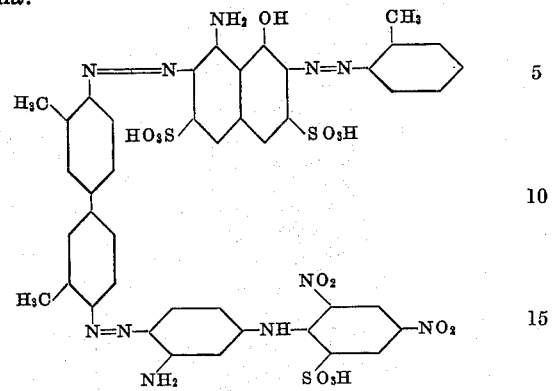

being a black powder, soluble in water, dyeing leather black shades of good fastness properties, especially of good fastness to acids.

FRITZ HESS.
WALTER PENSE.